US005658714A

United States Patent [19]
Westfall et al.

[11] Patent Number: 5,658,714
[45] Date of Patent: Aug. 19, 1997

[54] ISOLATION OF PROTEINS BY ULTRAFILTRATION

[75] Inventors: Peter Hilary Westfall, Columbus; Christy Ann Nardelli, Westerville; Karen Joyce Schimpf, New Washington, all of Ohio

[73] Assignee: Abbott Laboratories, Abbott Park, Ill.

[21] Appl. No.: 997,616

[22] Filed: Dec. 23, 1992

Related U.S. Application Data

[63] Continuation of Ser. No. 662,075, Feb. 28, 1991, abandoned.

[51] Int. Cl.$^6$ .................. C07K 1/30; C07K 1/34; C07K 2/00; C07K 14/415
[52] U.S. Cl. .................. 530/378; 530/370; 530/372; 530/376; 530/377; 530/414; 530/418
[58] Field of Search .................. 514/2; 530/350, 530/370, 372, 373, 374, 375, 376, 377, 378, 412, 414, 418, 427

[56] References Cited

U.S. PATENT DOCUMENTS

| | | | |
|---|---|---|---|
| 2,732,395 | 1/1956 | Bolley et al. | 558/144 |
| 3,622,556 | 11/1971 | O'Connor | 530/377 |
| 3,728,327 | 4/1973 | Frazeur et al. | 530/378 |
| 3,733,207 | 5/1973 | McCabe | 426/46 |
| 3,736,147 | 5/1973 | Iacobucci et al. | 530/378 |
| 3,995,071 | 11/1976 | Goodnight et al. | 426/598 |
| 4,072,670 | 2/1978 | Goodnight et al. | 530/378 |
| 4,088,795 | 5/1978 | Goodnight et al. | 426/598 |
| 4,091,120 | 5/1978 | Goodnight et al. | 426/598 |
| 4,420,425 | 12/1983 | Lawhon | 530/377 |
| 4,624,805 | 11/1986 | Lawhon | 530/376 |
| 4,697,004 | 9/1987 | Puski et al. | 530/378 |
| 4,897,465 | 1/1990 | Cordle et al. | 530/384 |
| 5,086,166 | 2/1992 | Lawhon et al. | 530/378 |
| 5,270,450 | 12/1993 | Westfall et al. | 530/378 |

FOREIGN PATENT DOCUMENTS

| | | |
|---|---|---|
| 1574110 | 9/1980 | United Kingdom . |
| 90/08476 | 9/1990 | WIPO . |

OTHER PUBLICATIONS

Windholz et al, eds., The Merck Index, 10th ed., published 1983 by Merck & Co. (Rahway), p. 1065.

Baker's Digest, vol. 43, No. 5, issued Oct. 1969, Wolf, "Chemical and Physical Properties of Soybean Proteins", pp. 30–37.

"Studies on the Preparation of Soy Bean Protein Free from Phosphorus" *Journal of Biological Chemistry*, 178:117–132 (1949), McKinney et al.

"Processing Whey–Type By–Product Liquids from Cottonseed Protein Isolation with Ultrafiltration and Reverse Osmosis Membranes" *Journal of Food Process Engineering*, 1977, pp. 15–35, Lawhon, et al.

"Optimization of Protein Isolate Production From Soy Flour Using Industrial Membrane Systems" *Journal of Food Science*, 43:361–369 (1978), Lawhon, et al .

"Alternate Processes for use in Soy Protein Isolation by Industrial Ultrafiltration Membranes" *Journal of Food Science*, 44:213–219 (1979), Lawhon, et al.

"Phytate–Protein Interactions in Soybean extracts and Low-–Phytate Soy Protein Products" *Journal of Food Science*, 44:596–600 (1979), deRham et al.

"Soy Protein Ingredients Prepared by New Processes–Aqueous Processing and Industrial Membrane Isolation" *Journal of American Oil Chemistry Society*, Mar. 1981, pp. 377–383 Lawhon, et al.

(List continued on next page.)

Primary Examiner—Jeffrey E. Russel
Attorney, Agent, or Firm—L. R. Drayer; D. O. Nickey

[57] ABSTRACT

A high quality soy protein isolate with a significant reduction in phytate and aluminum is prepared via ultrafiltration. Defatted soy flour slurry is prepared and adjusted to a pH such that the protein becomes solubilized. The solubilized protein can pass through the ultrafiltration membrane. The ultrafiltration system rejects phytate and aluminum. Once the soluble protein passes through the ultrafiltration system the soy protein isolate is then precipitated from the clear permeate stream by adjusting the pH within the isoelectric range of soy proteins.

22 Claims, 5 Drawing Sheets

OTHER PUBLICATIONS

"Production of Oil and Protein Food Products from Raw Peanuts by Aqueous Extraction and Ultrafiltration" *Journal of Food Science*, 45:391–395 (1981), Lawhon, et al.

"Combining Aqueous Extraction and Membrane Isolation Techniques to Recover Protein and Oil from Soybeans" *Journal of Food Science*, 45:912–916 (1981).

"Phytate Removal from Soy Protein Isolates Using Ion Exchange Processing Treatments" *Journal of Food Science*, 47:1280–1282 (1982), Brooks et al.

"New Techniques in Membrane Processing of Oilseeds" *Food Technology* Dec., 1984, pp. 97–106 Lawhon et al.

"Ultrafiltration Studies of Foods: Part 1–The Removal of Undesirable Components in Soymilk and the Effects on the Quality of the Spray–dried Powder" *Food Chemistry*, 20:183–180 (1986), Ang, et al.

"Effect of Phytic Acid Level in Soy Protein Based Infant Formulas on Mineral Availability in the Rat" *Journal of Agricultural Food Chemistry*, 37:1352–1357 (1989) Churella et al.

"Association of Zinc with Soy Proteins as Affected by Heat and pH" *Journal of Food Science*, 55:263–266 (1990), Khan et al.

"Effect of Local Food Processing on Phytate Levels in Cassava, Cocoyam, Yam, Maize, Sorghum, Rice, Cowpea, and Soybean" *Journal of Agriculture and Food Chemistry*, 38:1580–1585 (1990), Marfo, et al.

ISOLATION OF PROTEINS BY ULTRAFILTRATION

This is a Continuation of application Ser. No. 662,075 filed on Feb. 28, 1991, now abandoned.

FIELD OF THE INVENTION

The present invention relates generally to a method of isolating protein from a flour, and more particularly, to a method of isolating protein from soy flour and to nutritional products containing the protein isolated by said process.

BACKGROUND OF THE INVENTION

The prior art has dealt extensively with the subject of isolation, purification and improvement of the nutritional quality and flavor of soybean protein. Soybean protein in its native state has impaired nutritional quality due to the presence of phytic acid complexes which interfere with mammalian mineral absorption, and the presence of antinutritional factors including trypsin inhibitors which interfere with protein digestion in mammals.

The present invention provides a method of preparing an improved soy protein isolate having exceptionally low phytate and aluminum content. The aluminum content of soy based infant formulas is a significant concern. Infant nutritional formulas containing soy protein isolate produced using the methods disclosed herein are more nutritionally desirable since reduction of the aluminum content provides soy formula compositions more similar to human breast milk.

In a typical commercial process, the soy proteins are extracted at slightly alkaline pH from defatted soy flake or defatted soy flour. The major protein fraction is then precipitated from the clarified extract by adjusting the pH to the isoelectric point of the proteins (pH 3.8 to 6.0). Inasmuch as the proteins are insoluble at this pH the protein curd can be separated from soluble sugars, salts, etc., by centrifugation. To complete the purification, the protein curd is washed with water at least once at this isoelectric pH, then the protein is spray-dried either as is or after resuspension at neutral pH. Under such prior art conditions, a major portion of the phytate present in the soy flour will complex with the protein and will be present in the soy protein isolate. Commercial soy protein isolates typically have a phytate content of 2.0–2.5% and in some instances as much as 3% by weight.

In contrast to the prior art the present invention raises the pH of the aqueous slurry of soy flour to about 9.0. As used herein and in the claims "aqueous slurry" is understood to mean a slurry comprising more than 50% water by weight. After a suitable time for extraction the material is circulated through an ultrafiltration device that will pass the protein and reject fiber, aluminum and phytate. At the completion of the ultrafiltration process the pH of the permeate is adjusted to the isoelectric point of soy protein. The purified protein then precipitates, and the precipitated material is collected by centrifugation.

Filtration is a much used technique for separating wanted substances from those which are unwanted. There are two customary ways in which a feed stream meets a filter: dead-end filtration and cross flow filtration. In dead-end filtration, the feed stream flows perpendicular to the filter membrane. In cross flow filtration, on the other hand, the feed stream runs parallel to the filter membrane and the filtrate diffuses across it. The product which passes through the membrane is known as the "permeate" and the product which is retained is known as the "retentate". Filters are often classified by retained particle size. For example, membrane microfilters generally retain particles having a diameter greater than approximately 0.1–10 microns in diameter, ultrafilters generally retain particles and macromolecules having a diameter greater than approximately 0.05–0.1 microns and hyperfilters generally retain molecules having a diameter greater than approximately 0.001 microns. Put in another way, ultrafilters generally retain particles having molecular weights in excess of 10,000 to 500,000. In the laboratory, filter selection is usually straight forward, but scale-up to industrial applications often presents numerous difficulties.

In theory, ultrafiltration should permit the selective separation, concentration, and purification of protein components. In practice, ultrafiltration does not proceed according to ideal hypotheses. For example, most current ultrafiltration membranes have variable pore diameters and their molecular weight cut-off capacity is not uniform. Furthermore, the permeate flux (volume of product per unit of filter area per unit of time) of an ultrafiltration membrane is greatly affected by the presence of a polarization layer or by fouling of the membrane.

Polarization layers form in the course of ultrafiltration and modify the transfer of solutes across the membrane, thereby lowering the permeation rate of the device and changing its separation characteristics. Polarization is caused by convection through the membrane. If fluid flows through the membrane faster than the retained material can diffuse back into the retentate fluid, a saturated layer builds up next to the membrane. The layer's depth and its resistance to flow depend on the speed at which the retentate is circulated. The total permeability of the membrane in the course of operation depends on the polarization layer's thickness and also the nature of its components.

The resistance due to fouling builds as deposits chemically bind to the membrane. Fouling is quite distinct from polarization, in which the interfering layer is held against the membrane by hydrodynamic (not chemical) forces.

To obtain highly purified concentrates, filtration may be followed or accompanied by diafiltration which consists of adding additional fluid to the retentate concentrates and subjecting them to another filtration cycle. Diafiltration may be a batch process. (dilutions followed by successive concentrations) or a continuous process (water is added at the same rate as the permeate is eliminated).

The present invention relates to an improved ultrafiltration process for separating protein from undesirable components such as phytates and aluminum. This is accomplished by using metallic ultrafiltration membranes at a pH at which the protein will be soluble and pass through the membrane while phytates and aluminum are retained.

The prior art does not show a simple one step removal of phytate and aluminum via ultrafiltration.

PRIOR ART

The prior art contains many examples of methods of separating phytic acid, and phytates, from protein. The desirability of an economical method of separating phytates from the more nutritional components of a food, such as maize, rice, sorghum, cowpea, soybean, cassava, coyam and yam is well established, see for example "Effect of Local Food Processing on Phytate Levels in Cassava, Cocoyam, Yam, Maize, Sorghum, Rice, Cowpea, and Soybean", Marfo et al., *Journal of Agriculture and Food Chemistry*, 38:1580–1585 (1990).

Bolley et al., U.S. Pat. No. 2,732,395, teaches a method for separating phytic acid from various oil seeds with an aqueous acid extraction at a pH near the isoelectric point of the protein (about 4.5). The phytic acid is partly dissolved at this pH and is recovered. The protein is recovered by solubilizing it at an alkaline pH, separating the insoluble portion, and precipitating the protein at a pH near the isoelectric point. The resulting protein fraction contained as much as 4% organic phosphorus, which is an indicator of a high phytate content.

"Studies on the Preparation of Soy Bean Protein Free from Phosphorus", McKinney et al., *Journal of Biological Chemistry* 178:117–132 (1949), teaches that phytic acid dissociates from soy protein at pH values between 11.0 and 11.5 and forms a precipitate that may be removed by centrifugation.

Goodnight et al., U.S. Pat. No. 4,072,670, teaches that an alkali-stable complex is formed between protein and phytic acid in the acidic conditions used by Bolley et al. In an attempt to overcome this disadvantage, Goodnight et al. teaches precipitation of the phytate at pH values a little higher than those described by McKinney et al., i.e., pH values between 11.6 and 14. Phytate is then separated from the protein prior to protein precipitation at the protein isoelectric point of pH 4.5. One disadvantage of the Goodnight et al. process is that exposing proteins to such an extremely alkaline pH adversely affects the nutritive value of the protein. Also, there is a tendency to increase the undesirable formation of lysinoalanine. In addition, continuous centrifuges employed in industrial applications are unable to separate the very light phytate precipitate formed at such a high pH.

Goodnight et al., U.S. Pat. No. 4,088,795 teaches the removal of phytate by rendering the phytate insoluble at pH 10. This high of a pH is detrimental to protein. The insoluble protein is separated by centrifugation, then ultrafiltration. However; in the ultrafiltration step the protein is in the retentate. Goodnight et al., U.S. Pat. No. 3,995,795 teaches basically the same method as U.S. Pat. No. 4,088,795 with additional heat treating steps, as well as a recipe for soy milk containing a protein isolate.

Goodnight et al., U.S. Pat. No. 4,091,120 teaches the ultrafiltration of a material containing soy protein which has already been extracted and centrifuged. During ultrafiltration the protein is collected in the retentate while carbohydrates and minerals are passed into the permeate. In this patent Goodnight et al., also teach formulations for nutritional products containing soy protein isolated by the process taught therein.

deRham, UK Patent 1,574,110, teaches methods by which the phytic acid content of a soy protein isolate can be decreased to be in the range of 2% to 0.6%, when protein precipitation from neutral soy extract (extracted at pH 8.0) is performed at pH 5.7 instead of pH 4.5. When soy proteins are extracted at pH 2.5 and recovered at pH 4.5 the phytic acid content is reported to be 1.7%. By performing the precipitation at pH 5.5, the phytic acid content was reportedly decreased to 0.7%. The phytic acid concentration of the isolate could be decreased to 0.2% by extracting the protein at pH 11.5 and recovering it at pH 5.5. However, these methods suffer from various drawbacks, i.e. protein yield is decreased by as much as 20%, which renders them commercially impracticable.

"Phytate-Protein Interactions in Soybean Extracts and Low-Phytate Soy Protein Products", deRham et al, *Journal of Food Science* 44:596–600 (1979), teaches that calcium ions enhance the precipitation of soy protein at pH 11.5. Very low phytic acid concentrations could be achieved by extraction with 10% NaCl, but these methods produced a protein isolate which is effectively unusable without desalting by dialysis or ultrafiltration. Moreover, the protein yield according to these methods is low.

"Association of Zinc with Soy Proteins as Affected by Heat and pH", Khan et al., *Journal of Food Science* 55:263–266 (1990), at page 264 points out that one shortcoming of Goodnight et al. and deRham et al. is that unless most of the phytate is removed by centrifugation at pH 12.0 prior to acid precipitating the protein, isolated soy protein should be supplemented with zinc when it is the main source of zinc in the diet.

Puski et al., U.S. Pat. No. 4,697,004, teaches a soy protein preparation method in which proteins are extracted at a pH of 8 to 10 and at a temperature above 65° C. The protein product contains less than about 0.3% phytic acid. Again, however, such high temperatures adversely affect the solubility and other functional properties of the proteins.

"Phytate Removal from Soy Protein Isolates Using Ion Exchange Processing Treatments", Brooks et al., *Journal of Food Science* 47:1280–1282 (1982), teach a method for phytate removal from soy protein isolates using ion exchange treatments. A combination of cation and anion exchange processes is required for effective phytate removal. A dialysis step is used to remove other nonprotein components. This method, however, would be unacceptably complex and expensive for use on a commercial scale.

Enzymes, such as phytase, also have been used in the preparation of soy protein isolates. For example, McCabe, U.S. Pat. No. 3,733,207, teaches the preparation of a soluble protein fraction having a decreased phytic acid content. Proteins are solubilized in alkaline conditions, and wheat phytase is added after lowering the pH to about 5. The protein fraction not precipitated at pH 4.5 is recovered. The resulting protein, because of its solubility in acidic conditions, is suitable for carbonated beverages. The enzyme treatment is long, however, requiring 24–36 hours. The phytic acid content of the protein is not reported in the patent.

Published PCT Application WO 90/08476 teaches a method of producing a phytate free, or low phytate, soy protein isolate using the enzyme phytase.

Cordle et al., U.S. Pat. No. 4,897,465 teaches a method of enriching and concentrating selected proteins from protein containing fluids by means of ultrafiltration.

Iacobucci et al, U.S. Pat. No. 3,736,147, teaches a method of reducing phytate concentration in soy protein involving various chemical treatments in combination with ultrafiltration. The chemical treatments include hydrolysis of phytic acid by indigenous phytase at neutral pH, ultrafiltration in the presence of calcium ions at low pH, or the use of Ethylenediamine Tetraacetic Acid (EDTA) at high pH. The methods taught by Iacobucci et al. have several disadvantages. Soy globulins are known to dissociate into subunits and to be denatured at such low pH values. The use of calcium ions at low pH values requires an additional ultrafiltration step for salt removal. The high temperature (65° C.) in the phytase method may decrease the solubility of the protein on either side of the isoelectric point. The lowest phosphorous content achieved is not less than 0.2%, which corresponds to 0.7% phytic acid. The methods employ very time-consuming 18–48 hour ultrafiltrations.

The publications identified in this paragraph contain descriptions of numerous attempts to separate phytates from protein using ultrafiltration, but repeatedly the protein was captured in the retentate, so that either no separation was achieved or only a minor amount of separation was achieved. These separation processes were attempted not only with soybeans and soy milk, but also peanuts, cottonseed, and other vegetable sources of protein. Frazeur et al., U.S. Pat. No. 3,728,327, 1973. "Processing Whey-Type By-Product Liquids from Cottonseed Protein Isolation with Ultrafiltration and Reverse Osmosis Membranes", Lawhon et al., *Journal of Food Process Engineering*, 1:15–35 (1977). "Optimization of Protein Isolate Production From Soy Flour Using Industrial Membrane Systems", Lawhon et al., *Journal of Food Science*, 43:361–369 (1978). "Alternate Processes for use in Soy Protein Isolation by Industrial Ultrafiltration Membranes", Lawhon et al. *Journal of Food Science*, 44:213–219 (1979). "Soy Protein Ingredients Prepared by New Processes-Aqueous Processing and Industrial Membrane isolation", Lawhon et al., *Journal of American Oil Chemists Society*, March 1981, 377–383. "Production of Oil and Protein Food Products from Raw Peanuts by Aqueous Extraction and Ultrafiltration", Lawhon et al., *Journal of Food Science*, 45:391–395 (1981). "Combining Aqueous Extraction and Membrane Isolation Techniques to Recover Protein and Oil from Soybeans", Lawhon et al., *Journal of Food Science*, 46:912–916 (1981). "New Techniques in Membrane Processing of Oilseeds", Lawhon et al., December 1984, 97–106. "Ultrafiltration Studies of Foods: Part 1-The Removal of Undesirable Components in Soymilk and the Effects on the Quality of the Spray-dried Powder", Ang et al., *Food Chemistry*, 20:183–189 (1986). "Effect of Phytic Acid Level in Soy Protein Based Infant Formulas on Mineral Availability in the Rat", Churella et al., *Journal of Agriculture and Food Chemistry*, 37:1352–1357 (1989).

The prior art illustrates that considerable effort has been expended to develop methods to reduce the phytic acid content of soy protein. These methods, however, have suffered from various drawbacks, including inefficient phytic acid reduction, high cost, long treatment time requirements, unacceptable alterations of the treated protein, and incompatibility with commercial soy protein processing techniques and equipment.

As a result, there continues to be a need for an improved method of producing phytate-free or low phytate protein isolates and concentrates which avoids these drawbacks, while allowing protein isolate production on a practical commercial scale.

The present invention comprises a novel and unobvious method through which low-phytate protein isolates may be prepared. The invention further comprises low-phytate soy protein isolates produced according to the methods and processes of the present invention and the products containing the protein isolate so produced.

The prior art discussed above, taken either singly or in combination, does not teach or suggest that a protein isolate be passed through an ultrafiltration membrane into the permeate as in the present invention, but in fact clearly teaches the opposite.

DETAILED DESCRIPTION OF THE INVENTION

Figure 1:
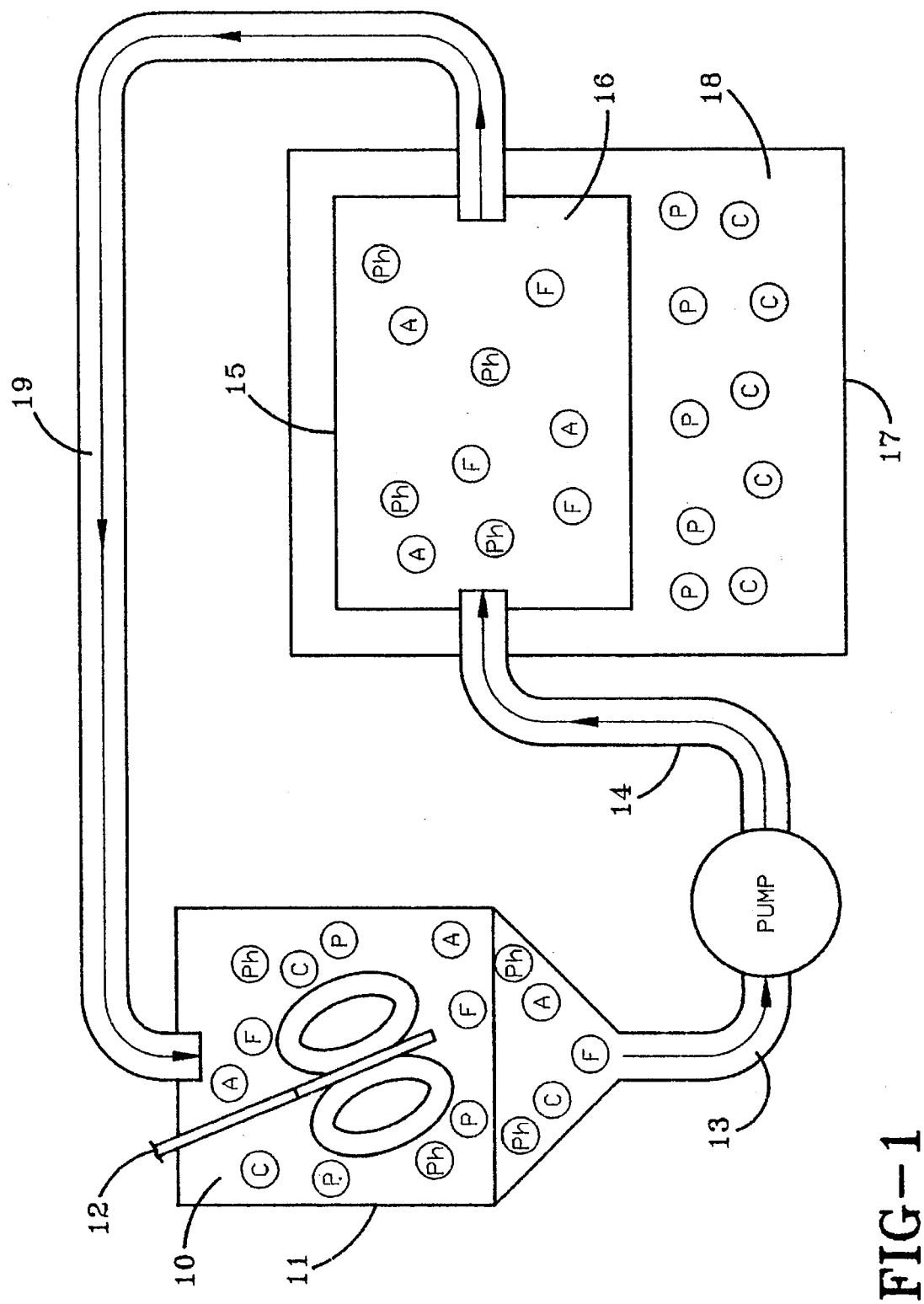
FIG. 1 is a diagrammatic representation of an apparatus used in the first step of a process for isolating protein from flour.

The present invention relates to a process for separating protein from phytate and aluminum by using ultrafiltration membranes in order to collect a permeate containing a protein isolate having a low content of phytate and aluminum and a retentate containing phytates and aluminum. Diafiltration of the retentate can be performed to enrich the permeate.

When the terms "phytate" is used herein and in the claims, it is understood to include salts of phytic acid or molecular complexes of phytic acid with other constituents of a food product. Phytic acid, the hexaorthomonophosphate ester of myo-inositol, occurs at fairly high levels in grains and oil seeds as the calcium magnesium salt, phytin. In soybean meal, roughly 70% of the total phosphorus is accounted for by phytin. Phytic acid will form a phytate-mineral-protein complex during processing which has been shown to reduce the bioavailability of various minerals, such as zinc, magnesium, calcium, iron, etc. During the preparation of protein isolates according to conventional methods much of the phytic acid and phytates remain associated with the protein in the form of complexes. Phytate removal from soy protein isolate is desirable because phytate phosphorous is not bioavailable as a nutritional entity to humans and it interferes with the absorption of nutritionally essential multivalent cations, such as calcium, iron and zinc. Therefore, it is desirable to eliminate or reduce the phytate content of soy based infant nutritional formulas.

A method of isolating protein according to the invention is best understood by referring to the drawing figures in conjunction with the following written description.

Figure 2:
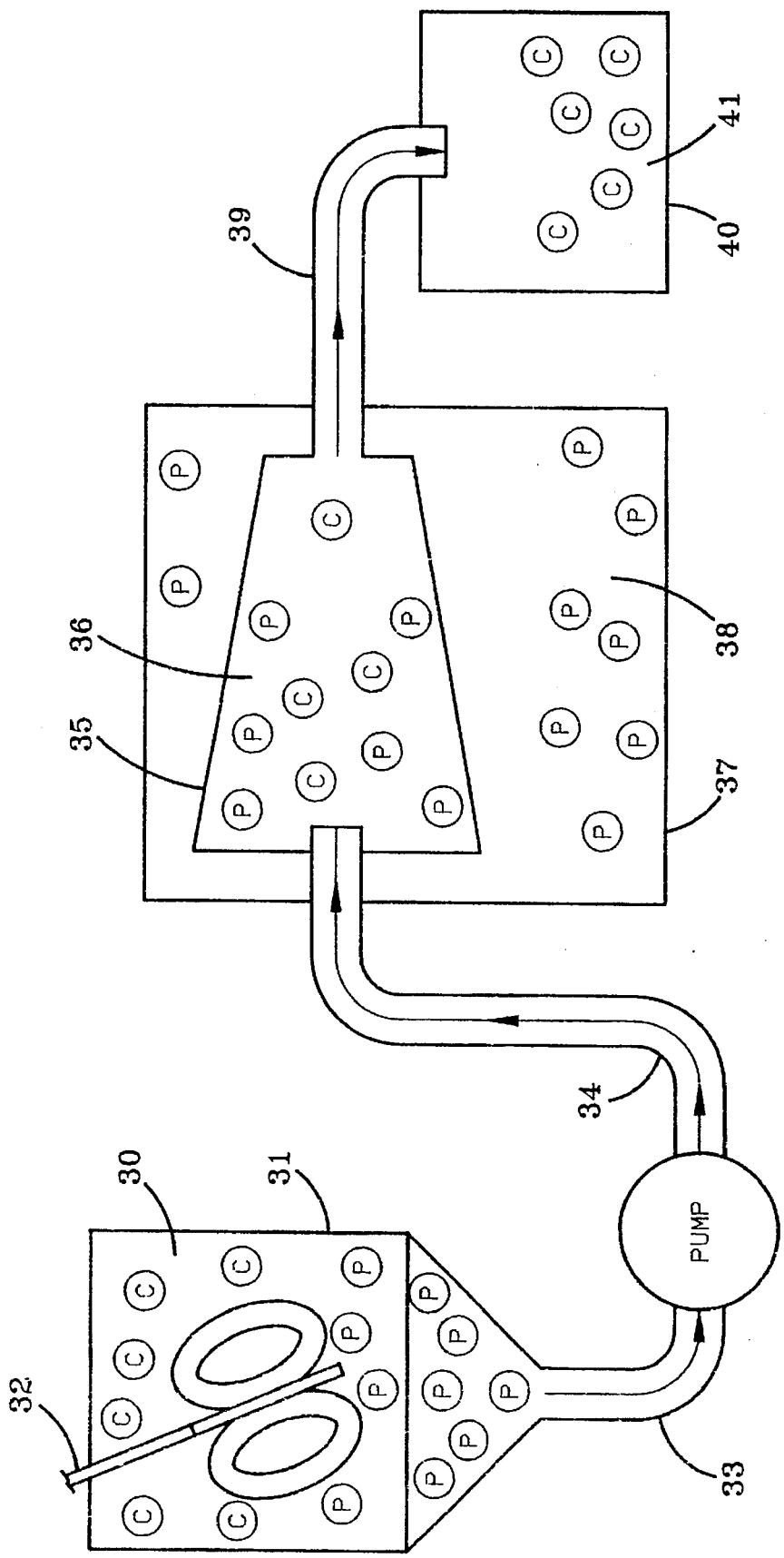
FIG. 2 is a diagrammatic representation of an apparatus used in the second step of a process for isolating protein from flour.
Figure 3:
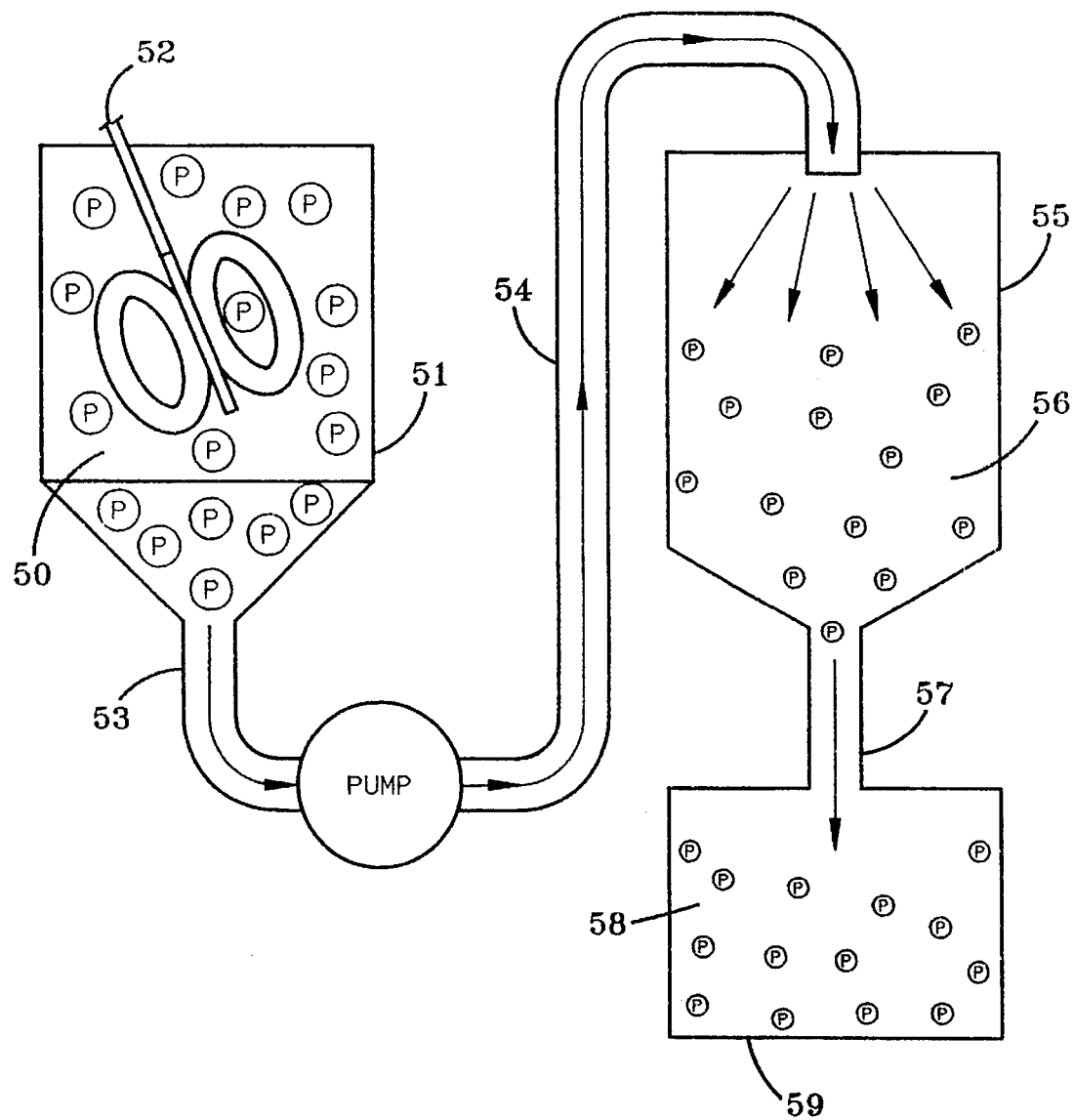
FIG. 3 is a diagrammatic representation of an apparatus used in converting a liquid suspension containing the proteins isolated in the first and second steps into a flake or powdered form.

With reference to FIG. 1, the first step in practicing the present invention is to provide a slurry 10 of a flour in a suitable reservoir 11, such as a mixing tank. As used herein and in the claims a "flour" is understood to mean the product obtained when a fruit or vegetable, or a processed fruit or vegetable component containing protein, has been ground into flake or powder form. While any flour containing protein may be used in the slurry, preferably the flour in the slurry is milled from at least one plant selected from the group of plants consisting of maize, rice, sorghum, cowpeas, soybeans, cassava, coyam, peas, peanuts, sesame, cotton, beans and yams. In the most preferred embodiments, the flour comprises defatted soy flour or defatted soy flakes. As used herein and in the claims "defatted soy flour" is understood to mean both defatted soy flour and defatted soy flakes. Preferably, the aqueous slurry comprises 1% to 30%, and most preferably 7% to 15%, by weight of defatted soy flour. As already stated above in the "BACKGROUND OF THE INVENTION" as used herein and in the claims "aqueous slurry" is understood to mean a slurry comprising more than 50% water by weight. The fluid portion of the aqueous slurry may be selected from water, and aqueous saline or sulfated solutions. In a preferred embodiment using defatted soy flour the fluid is water. In a most preferred embodiment the aqueous slurry comprises 10% by weight of defatted soy flour in water. The slurry may be agitated using a means for agitating 12 such as a motor driven agitator. The pH of the slurry is then adjusted to a level at which protein in the flour becomes solubilized. When the flour is soy flour, the pH of the slurry is adjusted to be preferably in the range of about 6.0 to about 12.0, and more preferably in the range of about 7.5 to about 9.5 at a temperature in the range of about 38° C. to about 54° C., preferably about 49° C. In FIGS. 1–3, the components of the flour which are represented in the drawings are proteins "P", carbohydrates "C", fiber "F", aluminum "A", and phytate "Ph".

The next step in isolating protein in accordance with the invention is passing the slurry through an ultrafiltration device and collecting a permeate containing protein and a retentate 16 containing phytates and aluminum. The slurry 10 passes through a tube 13 to a pump which pumps the slurry through a second section of tubing 14 into an ultrafiltration device 15. Preferably, the slurry is circulated through the ultrafiltration device more than one time, returning to the reservoir 11 via a third section of tubing 19, where a diafiltration fluid may be added to the retentate at substantially the same rate that the permeate 18 is collected in a suitable means for collecting 17. In the ultrafiltration device a portion of the fluid from the slurry along with proteins "P" and carbohydrates "C" are passed through the ultrafiltration membrane and collected as a permeate. The retentate 16, which does not pass through the ultrafiltration membrane, contains phytate "Ph", aluminum "A" and fiber "F". In a preferred embodiment the slurry is repeatedly passed through the ultrafiltration unit until the desired percentage of protein is isolated from the slurry.

Referring next to FIG. 2, the permeate 30 which is separated during the ultrafiltration process has been collected in a container 31, such as a tank, which preferably includes a means for agitating 32 the permeate. The pH of the permeate collected during the ultrafiltration step is adjusted to a level at which protein "P" precipitates. In the preferred embodiment employing soy flour the pH is adjusted with a non-toxic water soluble acid, such as hydrochloric acid, to be in the range of about 3.5 to about 6.0, most preferably in the range of about 4.2 to about 4.7. The precipitate is then collected by centrifugation or other techniques used by those skilled in the art.

One method for collecting the precipitate is to separate the precipitate from the remaining components of the permeate by centrifuging the permeate. In a preferred embodiment the permeate 30 passes through a first section 33 of tubing to a pump which propels the permeate through a second section 34 of tubing to a centrifuge 35. In the centrifuge protein "P" is separated from the carbohydrates "C" contained in the permeate 36. The product 38 of the centrifuging process which contains protein "P" is collected in a container 37. The remainder 41 of the permeate, containing carbohydrates "C", passes through another section of tubing 39 and is collected in a suitable container 40. The protein-phytate complex will not form since the phytate was removed during the ultrafiltration step. The protein "P" collected during centrifugation may be employed in a nutritional product as is following centrifugation, or preferably the protein is converted into a flake or powdered form by well known drying methods such as spray-drying or freeze-drying.

Referring to FIG. 3 as a non-limiting example, the protein "P" which is the product of the centrifugation 50 is collected in a container 51 which preferably includes a means for agitating 52. The protein curd is redissolved in an aqueous solution at a pH in excess of the isoelectric range of the protein. The solution containing the protein passes through a first section 53 of tubing to a pump which propels the solution through a second section of tubing 54 to a dryer 55. While passing through the dryer the solution 56 containing protein "P" is converted into flakes or powder 58 which passes through a chute 57 into a container 59.

Finally, rather than drying, the precipitated and separated protein may be redissolved, optionally at a pH in excess of the isoelectric range, and the resulting protein isolate may then be formulated into dietary products by combination with the desired carbohydrate and fat ingredients and, if desired, vitamins, minerals, flavors, etc.

The product, referred to as a protein isolate, produced by the process which has been disclosed herein has utility as an ingredient in a nutritional composition. A soy protein isolate produced by the above described process has utility as an ingredient in a nutritional product, and preferably in a non-dairy nutritional product for human infants.

BEST MODE

The best mode of practicing the invention which is known at the time of filing a patent application in the U.S.A. employs an ultrafiltration device which was purchased by Ross Laboratories, a division of Abbott Laboratories, from Carre, Inc. of Seneca, S.C., U.S.A. Carre, Inc. has been acquired by E.I. du Pont de Nemours & Co., of Wilmington, Del., U.S.A., and is now known as the Separation Systems Division of du Pont. Accordingly, some details of the structure of the ultrafiltration device including the exact material and porosity of the ultrafiltration membranes is known only by the manufacturer of the device.

Figure 4:
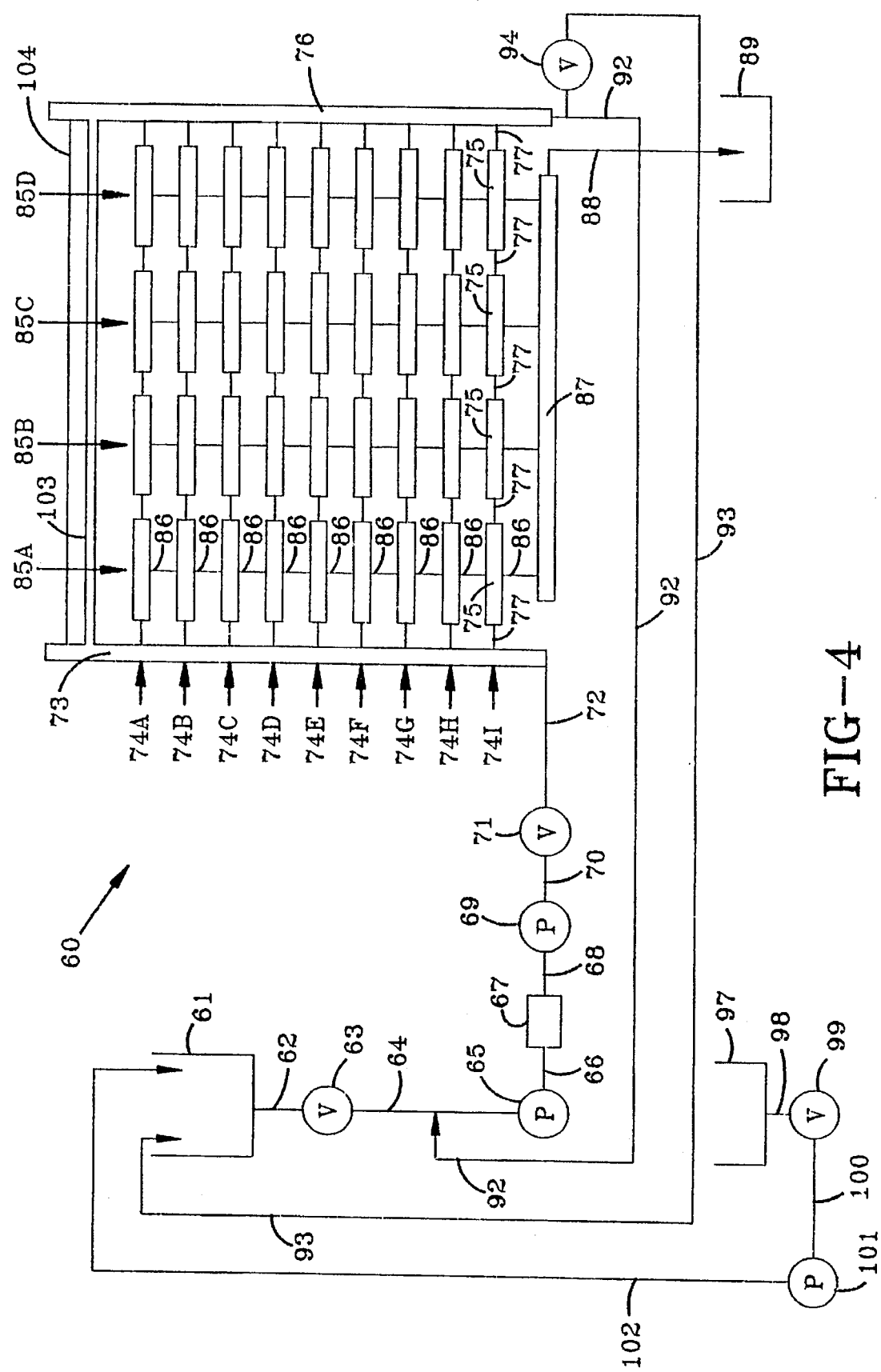
FIG. 4 is a schematic representation of an ultrafiltration device used in practicing the best mode of the invention and FIG. 5 is an enlarged schematic cross-sectional view of one ultrafiltration module of said device.

FIG. 4 is a schematic representation of the ultrafiltration device 60 used in the practice of the best mode of the invention. A slurry is provided in a reservoir 61. The initial extraction slurry is formed by adding, with agitation, one part by weight of defatted soy flour or flakes to nine parts by weight of an aqueous slurry media at a pH of 9.0 and a temperature of about 50° C. The slurry is maintained at the desired pH and temperature for about thirty minutes to one hour, and preferably thirty minutes.

The slurry flows through a section of tubing 62 to a shut-off valve 63. The slurry flows from the shut-off valve 63 through a section of tubing 64 to a 1.5 horsepower centrifugal feed pump 65. The slurry flows from the feed pump 65 through a section of tubing 66 to a flow meter 67, through the flow meter, then through another section of tubing 68 to a 30 horsepower centrifugal recirculating pump 69. The slurry then flows from the recirculating pump 69 through a section of tubing 70 to a flow control valve 71, through the flow control valve, and through another section of tubing 72 to a slurry feed manifold 73. The flow control valve is adjusted such that about 2,400 liters per minute circulates through the ultrafiltration device.

The filtering actually takes place in nine parallel filtering cascades 74A–74I, each of which comprises four ultrafiltration modules 75 connected in series. The nine filtering cascades 74A–74I extend between the slurry feed manifold 73 and the retentate collection manifold 76. The ultrafiltration modules 75 in each filtering cascade 74A–74I are connected to one another, and to the slurry feed and retentate collection manifolds, via lengths of connecting tubing 77.

Figure 5:
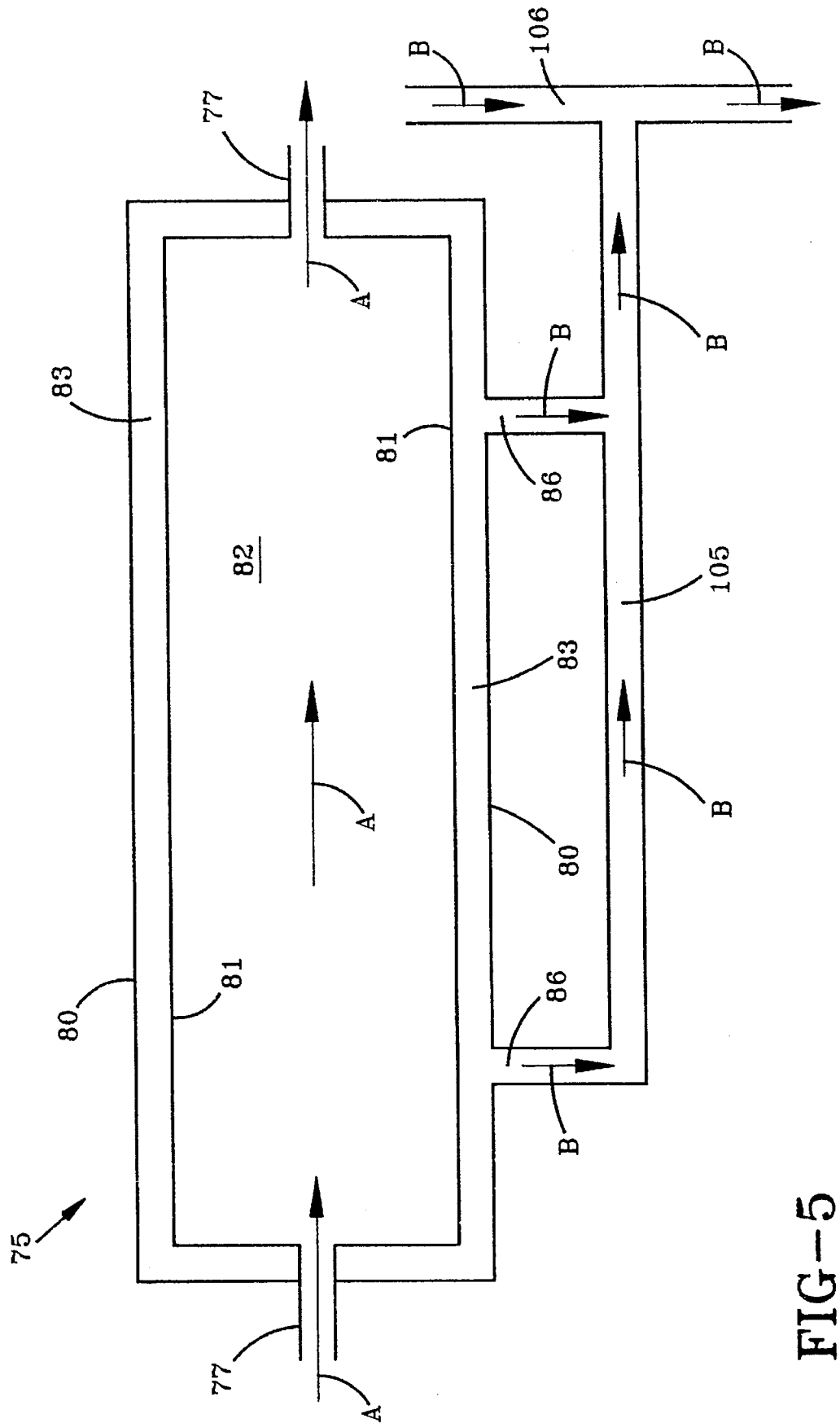

The structure of an individual ultrafiltration module 75 may best be described by referring to FIG. 5, which is a schematic cross-sectional view, taken in a longitudinal direction, of an ultrafiltration module. The ultrafiltration modules used in the practice of the best mode of the invention each comprise a hollow outer cylindrical shell 80, which encloses a hollow inner cylindrical ultrafiltration membrane 81. Per the specifications of the manufacturer the length of each module is about 3.1 m, the interior diameter of the shell 80 is about 3.8 cm, and the interior diameter of the ultrafiltration membrane 81 is about 3.2 cm. The slurry passes through a connecting tube 77 into a cavity 82 interior of the ultrafiltration membrane, through the ultrafiltration module and the retentate exits through another connecting tube 77 as indicated by the arrows labeled "A" in FIG. 5.

The ultrafiltration filtration membrane comprises a rigid porous metallic membrane, such as sintered stainless steel, having an initial permeability to water in the range of about 0.24 to about 12.5 as determined by the formula:

$$\text{Permeability} = \frac{\text{Permeate Flux}}{\text{Inlet Pressure}}$$

where permeate flux is the number of liters of water passing through a square meter of membrane per hour and inlet pressure is measured in kiloPascals. A preferred initial membrane permeability to water is about 8.0. If desired, a metallic oxide coating may be deposited on the rigid porus membrane to fine tune the porosity of the membrane, but the presence of such a coating is believed not to be essential to the practice of the present invention.

Referring to both FIGS. 4 and 5, the permeate which passes through the ultrafiltration membrane into the permeate collecting cavity 83 comprises water, protein, carbohydrates and minerals. Four permeate collecting cascades 85A–85D, each comprising nine ultrafiltration modules 75 are connected in series by a primary permeate collecting tube 106. Secondary permeate collecting tubes 86 pass the permeate from the ultrafiltration module to the primary permeate collecting tube 106 via tube 105 as indicated by the arrows labeled "B", and the primary permeate collecting tube passes the permeate to the permeate collecting manifold 87. There are four permeate collecting cascades 85A–85D, which are arranged in parallel with respect to one another. The permeate passes through a tube 88 to a permeate collecting container 89. Like numbered elements of FIGS. 4 and 5 are the same.

The retentate passes from one ultrafiltration module 75 to the next until it enters the retentate collection manifold 76. At least a portion of the retentate passes through a section of tubing back 92 to tubing section 64 which is interposed between the valve 63 and the first pump 65, and is re-circulated through the filtering system. A portion of the retentate may be passed through tubing section 93 and returned to the slurry reservoir 61. The relative portions of the retentate which pass back into tubing section 64 and back into the slurry reservoir 61 are controllable by means of a return flow control valve 94.

Diafiltration fluid may be added to the retentate in order to maintain a substantially constant volume and concentration of materials in the circulating retentate. A source of diafiltration fluid, such as a reservoir 97, provides fluid which passes through a section of tubing 98 to a shut-off valve 99, through the shut-off valve 99, through a second section of tubing 100, to a pump 101, which propels the diafiltration fluid through another section of tubing 102 to the slurry reservoir 61. The diafiltration fluid used in the best mode was water.

At least one tube heat exchanger 103 extends between the slurry intake manifold 73 and the retentate collection manifold 76, and functions to cool a portion of the slurry. An overflow tube 104 extends between the slurry intake manifold 73 and the retentate collection manifold 76, in parallel with the filtering cascades 74A–74I and functions to collect and transmit any slurry in excess of the volume capacity of the filtering system.

EXPERIMENT I

The ultrafiltration membranes of the ultrafiltration unit described above in the BEST MODE section had a metallic oxide coating deposited thereon according to instructions provided by the manufacturer of the ultrafiltration unit. First, a solution consisting of 180 grams of a metallic oxide powder which was obtained from E.I. du Pont de Nemours & Co. and labeled only as "WD2", which was not analyzed, mixed in about 380 liters (100 gallons) of water, was circulated through the ultrafiltration unit for about 30 minutes at temperatures in the range of about 16° C. to 38° C. at an inlet pressure in the range of about 200 to about 480 kilopascal (30 to 70 psi) and an outlet pressure in the range of about 140 to about 410 kilopascal (20 to 60 psi). Next, a solution consisting of 54 grams of a powder which also was obtained from E.I. du Pont de Nemours & Co. and labeled only as "WD1", which was not analyzed, mixed in about 380 liters (100 gallons) of water was circulated through the ultrafiltration unit for about 30 minutes under substantially the same conditions described in the immediately preceding sentence. Those skilled in the art will appreciate that these coating materials are only examples, and that any suitable materials may be employed a coating on an ultrafiltration membrane without departing from the spirit or scope of the present invention.

Thirty-seven kilograms of defatted soy flour was slurried with about 380 kilograms of water (about a 10% soy flour slurry by weight) and adjusted to pH of 9.0 using 20% potassium hydroxide. The slurry was agitated and maintained at a temperature of about 50° C. for 60 minutes.

The slurry was pumped through the ultrafiltration unit after the ultrafiltration membranes had the metallic oxide coating deposited thereon as previously described. As permeate was generated diafiltration water was added at the same rate until about 1,500 kilograms of diafiltration water was used.

The permeate flux initially was about 37 $L/m^2$–hr and dropped to about 29 $L/m^2$–hr after one hour of operation and remained at this flux rate until the end of the experiment. The inlet pressure was about 240 kilopascal and the outlet pressure was about 80 kilopascal. The linear velocity of the fluid was about 5 m/s. Under these conditions about 1,800 liters of permeate was generated. The permeate contained soluble soy proteins.

The permeate was collected and adjusted to a pH of about 4.5 with 20% hydrochloric acid. The insolubilized protein curd which precipitated out was separated by centrifugation in batches.

The aluminum content of the defatted soy flour which was the starting material was about 4.0 mg/kg and the aluminum content of the soy protein isolate produced in the experiment was about 0.5 mg/kg, which is about an 88% reduction in aluminum content. The content of organic phosphorus as determined by a method similar to the anion exchange AOAC method 14B.01 (Harland and Oberleas) was about 3,500 parts per million in the defatted soy flour which was the starting material and only about 1,500 parts per million in the soy protein isolate produced by the experiment, which is about a 57% reduction in organic phosphorus content. In the first four experiments the level of organic phosphorus was used only as an indicator of the phytate level in the various materials, because a reliable method of determining the actual phytate level was not available at that time.

Representative of a non-dairy nutritional product for human infants containing a soy protein isolate is a product marketed by Ross Laboratories, a division of Abbott Laboratories under the trade name Isomil®. Isomil® is labeled as containing the following ingredients: (Pareve®) 86% water, 4.8% corn syrup, 2.5% sucrose, 2.1% soy oil, 2.0% soy protein isolate, 1.4% coconut oil, 0.14% calcium citrate, 0.13% calcium phosphate tribasic, potassium citrate, potassium phosphate monobasic, potassium chloride, mono- and diglycerides, soy lecithin, magnesium chloride, carrageenan, ascorbic acid, L-methionine, potassium phosphate dibasic, sodium chloride, choline chloride, taurine, m-inositol, ferrous sulfate, alpha-tocopheryl acetate, zinc sulfate, L-carnitine, niacinamide, calcium pantothenate, cupric sulfate, vitamin A palmitate, thiamine chloride hydrochloride, riboflavin, pyridoxine hydrochloride, folic acid, manganese sulfate, potassium iodide, phylloquinone, biotin, vitamin D3 and cyanocobalamin.

In order to make a preliminary evaluation of the feasibility of using a protein isolate produced by the method disclosed herein in a non-dairy nutritional product for infants, the product of this experiment was used as the soy protein isolate ingredient in a batch of a nutritional product substantially like the above described Isomil® formulation in a ready-to-feed form. No adverse effects were observed, but no tests were made and the Isomil® was discarded.

EXPERIMENT II

A second experiment was run using substantially the same procedure under substantially the same conditions as EXPERIMENT I. No tests for aluminum content were made. The level of organic phosphorus in the soy flour which was the starting material was about 5,600 parts per million, and the level of organic phosphorus in the protein isolate produced in the experiment was about 1,800 parts per million, which is about a 68% reduction in organic phosphorus content. In order to further evaluate the feasibility of using a protein isolate produced by the method of this invention in a non-dairy nutritional product for human infants, the product of this experiment was used as the soy protein isolate ingredient in a batch of a nutritional product substantially like the above described Isomil® formulation in a concentrated liquid. (A concentrated liquid is one which must be diluted with water before it is fed to an infant.)

Amino acid profiles of Isomil® concentrated liquid manufactured with soy protein isolate made using the method disclosed herein and commercial Isomil® concentrated liquid were compared to one another. The comparison showed that the use of the soy protein isolate manufactured by the process disclosed herein has little effect upon the amino acid profile of this infant nutritional product.

It was therefore surprising and unexpected that when the viscosity of the above described nutritional products were evaluated at three days of age the viscosity of the product containing a prior art soy protein isolate was about 29 centipoise while the viscosity of the product containing the soy protein isolate made by the method disclosed herein was only about 11 centipoise. This decrease in the viscosity of the nutritional product is significant because a product containing a soy protein isolate manufactured by the process disclosed herein in a liquid state can flow more smoothly through a manufacturing system during the process of manufacturing the nutritional product, therefore requiring less energy to pump the liquid through the system.

EXPERIMENT III

A slurry containing about 20%, by weight, defatted soy flour in water was prepared, but the slurry was too thick to pass through the ultrafiltration unit effectively. Note that a continuous centrifuge was also used in subsequent experiments IV, V, VI, VII and VIII. No tests were made on the permeate. While it is theorized that a more concentrated slurry could be successfully processed using modified equipment and refined processing techniques, further attempts at using slurry concentrations of greater than about 10% defatted soy flour (by weight) have not been made at the time of filing a patent application in The United States of America.

EXPERIMENT IV

A fourth experiment was run using substantially the same procedure under substantially the same conditions as EXPERIMENT I with the exception that in the final step the precipitated protein was separated with a continuous centrifuge rather than a batch centrifuge. No tests were made for aluminum content. The level of organic phosphorus in the starting material was about 3,700 parts per million, and the level of organic phosphorus in the soy protein isolate produced in the experiment was about 800 parts per million, which is a reduction of about 78% in organic phosphorus content.

By this time the need for a method of more specifically determining the level of phytate, not just the level of organic phosphorus, in the starting material and the protein isolate was becoming more evident. Through the expenditure of a great deal of effort such a method was developed. The term "protein isolate having a low phytate content" as employed herein and in the claims is understood to mean a protein product containing 88% or more by weight of protein and less than 1.0% by weight of phytate as determined by the analytical method set forth below.

With respect to the invention disclosed and claimed herein the procedure utilized for the determination of phytate content in a protein isolate is set forth below and involves the extraction of phytate with hydrochloric or trichloroacetic acid, separation on a mixed-mode column using a sodium hydroxide gradient, and subsequent detection via suppressed conductivity. The procedure comprises the following steps.

1. A protein isolate sample is weighed and extracted in 2.4% by vol. hydrochloric acid in a shaker bath for two hours. It is understood that sample weight is dependent upon the estimated concentration of phytate, i.e. the higher the estimated level of phytate the smaller the sample size should be.

2. The pH of the sample is adjusted to be greater than 8, followed by quantitative transfer and dilution to a specified volume. It is believed that persons of ordinary skill in the science of analytical chemistry will understand that the exact amount of dilution is dependent upon the estimated concentration of phytate in the sample.

3. The diluted sample is filtered through #2V Whatman filter paper and the filtrate is collected in a suitable container.

4. An aliquot of the filtrate is injected onto an OmniPac™ mixed mode column, available from Dionex Corporation, Sunnyvale, Calif., U.S.A. and separation is achieved utilizing a 200 mM sodium hydroxide gradient in the range of 28% to 75%, or a 56 mM to 150 mM sodium hydroxide gradient, in the presence of 5% isopropyl alcohol by vol. at a flow rate of 1.0 ml per minute.

5. Detection of phytate in the sample is made via suppressed conductivity utilizing a Dionex AMMS artion micromembrane suppressor. The micromembrane suppressor exchanges increasing sodium ions in the mobile phase with hydrogen cations from the regenerant (0.15% sulfuric acid), thereby suppressing the increasing background signal present due to the increasing sodium hydroxide concentration in the gradient. The detector then measures conductivity due to the structurally attached phosphate portion of the phytate structure.

6. The concentration of phytate in the sample is determined by comparison of chromatographic data of the sample with standards of known concentrations of phytate. For example, this analytical procedure has been successfully practiced using a Spectra Physics Model 4270 Integrator, but it is understood that any suitable equipment such as another integrating system or a chart recorder may be employed in this procedure.

It is believed that a person of ordinary skill in the science of analytical chemistry will find it obvious to adjust sample sizes, dilutions, and so forth of materials which are to be compared, (including known concentrations), in order that the results may be plotted in an easily comparable range of values.

The phytate content of the protein isolate produced in EXPERIMENT IV determined using the new analytical procedure was about 0.18%, by weight, but the soy flour which was the starting material was not evaluated with the new analytical procedure.

EXPERIMENT V

A fifth experiment was run using substantially the same procedure under substantially the same conditions as EXPERIMENT I with the exception that two batches of slurry were run through the ultrafiltration unit, the second batch using the retentate from the first run as the starting slurry. (The ultrafiltration membranes were cleaned and recoated with "WD2" and "WD1" between the two runs.) The objective of this experiment was to attempt to increase the protein recovery rate. The phytate content of the soy flour which was the starting material was about 2.10%, and the phytate content, by weight, of the protein isolate produced in the experiment was about 0.30%, which is about an 86% reduction in phytate content.

Microbiological studies were made of the starting material and protein isolate from this experiment, and the results are set forth below in TABLE I.

TABLE I

| Test | Soy Flour | Protein Isolate |
| --- | --- | --- |
| Standard Plate Count | $1.79 \times 10^4$/g | $8.00 \times 10^2$/g |
| Coliforms | >1250/g | <5/g |
| Mold/Yeast | 900/g | <10/g |

The microbiological data for the protein isolate produced according to the method disclosed herein indicates that it is suitable for use in a food product for human consumption. Inasmuch as production processes for commercially available soy protein isolates include heat treatment steps to control microbiological levels, it is believed to be an advantage of the process disclosed herein that a separate heat treating step is not necessary for the purpose of controlling microbiological levels.

An attempt was made to estimate the recovery rate of protein using the method disclosed herein, based upon this experiment. The calculated recovery rate based upon the estimated weight of protein in the starting material and weight of the resultant protein isolate was only about 29%. While this is a lower recovery rate than would be desired in a commercial manufacturing operation, it is believed that the recovery rate may be increased with bigger batch sizes and refined processing equipment.

EXPERIMENT VI

A sixth experiment was run using substantially the same procedure under substantially the same conditions as EXPERIMENT I with the exception that no metallic oxide coating was deposited onto the ultrafiltration membranes. The phytate content, by weight, of the soy flour which was the starting material was about 2.10%, and the phytate content, by weight, of the protein isolate produced in the experiment was about 0.44%, which is about a 79% reduction in phytate content.

EXPERIMENT VII

A seventh experiment was run using substantially the same procedure under substantially the same conditions as EXPERIMENT I with the exceptions that no metallic oxide coating was deposited onto the ultrafiltration membranes and the pH of the soy flour slurry was raised to about 9.7 rather than 9.0 prior to the ultrafiltration procedure. The protein isolate produced in this experiment was discolored and therefore was not considered to be desirable for use in a commercial product. The phytate content, by weight, of the soy flour which was the starting material was about 2.10%, and the phytate content, by weight, of the protein isolate produced in the experiment was about 0.27%, which is about an 87% reduction in phytate content. Those skilled in the art will recognize that depending upon the intended use of the protein isolate a range of pH values of about 6.0 to about 12.0 for solubilizing protein could be used.

EXPERIMENT VIII

An eighth experiment was run using substantially the same procedure under substantially the same conditions as EXPERIMENT I with the exceptions that no metallic oxide coating was deposited onto the ultrafiltration membranes and the initial slurry (10% soy flour by weight at pH 9.0) was centrifuged. The resultant liquid, which contained protein, was used as the starting aqueous slurry for the ultrafiltration step. The permeate generated from the ultrafiltration step was then pH adjusted to 4.5 to precipitate the soy protein isolate. The phytate content, by weight, of the soy flour which was the starting material was about 2.10% and the phytate content, by weight, of the soy protein isolate collected after the ultrafiltration procedure was about 0.18%, which is about a 91% reduction in phytate content. It was concluded as a result of Experiments VI, VII and VIII that the use of a metallic oxide coating on the ultrafiltration membranes is not critical to the method of making a protein isolate which is disclosed herein.

The following TABLE II is a comparison of the phytate content, as determined using the analytical method disclosed herein, and the aluminum content of representative lots of defatted soy flour, commercially available soy protein isolates and soy protein isolate prepared according to the process disclosed herein. The phytate contents were determined using the procedure which has already been described herein.

TABLE II

| MATERIAL | % PHYTATE | ALUMINUM (mg/kg) |
| --- | --- | --- |
| Defatted Soy Flour | 2.10 | 4.0 |
| PP 1610 | 2.05 | 16.0 |
| PP 750 | 2.18 | 14.0 |
| Edipro A | 2.94 | 15.0 |

TABLE II-continued

| MATERIAL | % PHYTATE | ALUMINUM (mg/kg) |
|---|---|---|
| Ardex F | 2.38 | |
| Soy Protein Isolate of the present invention | 0.18 to 0.30 | 0.5 |

PP1610, PP750 and Edipro A are commercially available soy protein isolate products manufactured by Protein Technology International which is a division of Ralston Purina. (Protein Technologies International has indicated that some time in 1991 the "trade name" of PP1610 will be changed to "SUPRO 1610" and the "trade name" of PP750 will be changed to "SUPRO 750".) Ardex F is a commercially available soy protein isolate manufactured by Archer Daniels Midland. It is believed that all of these commercially available soy protein isolates are made by adjusting the pH of a soy flour slurry to about 9 in order to solubilize the protein; then centrifuging the slurry to separate a sludge of fiber and insoluble materials from a centrate containing the soluble protein; then adjusting the pH of the centrate to 4.5 to precipitate the protein; and then again centrifuging to get a sludge containing the protein. Edipro A is the isoelectric form of the soy protein isolate having a pH of 4.5. PP1610 is similar to Edipro A but has had the pH adjusted to 7.0 to neutralize it. Ardex F is essentially the same as PP1610. PP750 is like PP1610 with added enzymes to slightly hydrolyze it.

As indicated in TABLE II the phytate content of the soy protein isolate prepared according to the process of the invention has over a 90% reduction in phytate as compared to commercially available soy protein isolate and soy flour. Furthermore, there is shown a very significant reduction in aluminum content from the starting material, soy flour, to the final soy protein isolate prepared according to the process disclosed herein. It is to be noted that the aluminum content of the commercially available soy protein isolates is greater than that of the defatted soy flour. It is believed that this high aluminum content is the result of contamination from an alkaline solution used in the manufacture of these commercial products.

INDUSTRIAL APPLICABILITY

The invention disclosed herein is a method or producing a protein isolate which has utility as an ingredient in a nutritional compound. An example of such a nutritional compound is a non-dairy nutritional product for human infants.

While preferred embodiments of the invention have been described herein, it will be apparent to those skilled in the art that various changes and modifications may be made therein without deviating from the spirit or scope of this invention.

We claim:

1. A method of isolating protein from a flour comprising the steps of:
   (a) providing an aqueous slurry of a flour;
   (b) adjusting the pH of the slurry to be in the range of about 7.0 to about 10.0 at a temperature in the range of about 38° about 54° C. such that the protein in the flour becomes solubilized;
   (c) passing the slurry through an ultrafiltration device and collecting a permeate containing protein and a retentate containing phytate and aluminum;
   (d) adjusting the pH of the permeate collected in step (c) to be in the range of about 3.5 to about 6.0 such that the protein precipitates; and
   (e) collecting the protein precipitate of step (d), the phytate content of the precipitated protein of step (e) being less than 1.0%, by weight, as determined by the following procedure:
      (i) a protein isolate sample is weighed and extracted in 2.4% by vol. hydrochloric acid for two hours;
      (ii) the pH of the sample is then adjusted to be greater than 8, followed by quantitative transfer and dilution;
      iii) the diluted sample is filtered through #2V filter paper and the filtrate is collected;
      iv) an aliquot of the filtrate is injected into a mixed mode column and separation is achieved utilizing a 56 mM to 150 mM sodium hydroxide gradient, in the presence of 5% isopropyl alcohol by vol. at a flow rate of 1.0 ml per minute;
      (v) using suppressed conductivity to detect phytate in the sample; and
      vi) the phytate concentration of the sample is determined by comparing chromatographic data of the sample with standards of known concentrations of phytate.

2. A method of isolating protein from a flour according to claim 1 wherein step (e) comprises centrifuging the product of step (d) to separate the protein precipitate from the remainder of the permeate.

3. A method of isolating protein from a flour according to claim 1 further comprising the step (f) of transforming the protein precipitate collected in step (e) into a powdered form.

4. A method of isolating protein from a flour according to claim 2 further comprising the step (f) of transforming the protein precipitate collected in step (e) into a powdered form.

5. A method of isolating protein from a flour according to claim 1 wherein step (c) comprises passing the slurry through an ultrafiltration device and collecting a permeate containing protein and a retentate containing phytate and thereafter adding a diafiltration fluid to the retentate at substantially the same rate that the permeate is collected and passing said retentate through the ultrafiltration device.

6. A method of isolating protein from a flour according to claim 2 wherein step (c) comprises passing the slurry through an ultrafiltration device and collecting a permeate containing protein and a retentate containing phytate and thereafter adding a diafiltration fluid to the retentate at substantially the same rate that the permeate is collected and passing said retentate through the ultrafiltration device.

7. A method of isolating protein from a flour according to claim 3 wherein step (c) comprises passing the slurry through an ultrafiltration device and collecting a permeate containing protein and a retentate containing phytate and thereafter adding a diafiltration fluid to the retentate at substantially the same rate that the permeate is collected and passing said retentate through the ultrafiltration device.

8. A method of isolating protein from a flour according to claim 4 wherein step (c) comprises passing the slurry through an ultrafiltration device and collecting a permeate containing protein and a retentate containing phytate and thereafter adding a diafiltration fluid to the retentate at substantially the same rate that the permeate is collected and passing said retentate through the ultrafiltration device.

9. A method of isolating protein from a flour according to claim 1 wherein the flour in said slurry is milled from at least one plant selected from the group of plants consisting of maize, rice, sorghum, cowpeas, soybeans, cassava, coyam, sesame, peanuts, peas, cotton and yams.

10. A method of isolating protein from soy flour comprising the steps of:
   (a) providing an aqueous slurry comprising 1% to 30% by weight of soy flour;
   (b) adjusting the pH of the slurry to be in the range of about 7.5 to about 9.5 at a temperature in the range of about 38° to about 54° C. such that protein in the slurry becomes solubilized;
   (c) passing the slurry through an ultrafiltration device and collecting a permeate containing protein and carbohydrates and a retentate containing phytate and aluminum;
   (d) adjusting the pH of the permeate collected in step (c) to be in the range of 3.5 to 6.0 and allowing the protein to precipitate; and
   (e) separating the precipitated protein from the remainder of the permeate, the phytate content of the precipitated protein of step (e) being less than 1.0%, by weight, as determined by the following procedure:
      (i) a protein isolate sample is weighed and extracted in 2.4% by vol. hydrochloric acid for two hours;
      (ii) the pH of the sample is then adjusted to be greater than 8, followed by quantitative transfer and dilution;
      (iii) the diluted sample is filtered through #2V filter paper and the filtrate is collected;
      (iv) an aliquot of the filtrate is injected into a mixed mode column and separation is achieved utilizing a 56 mM to 150 mM sodium hydroxide gradient, in the presence of 5% isopropyl alcohol by vol. at a flow rate of 1.0 ml per minute;
      (v) using suppressed conductivity to detect phytate in the sample; and
      (vi) the phytate concentration of the sample is determined by comparing chromatographic data of the sample with standards of known concentrations of phytate.

11. A method of isolating proteins from soy flour according to claim 10 further comprising the step (f) of transforming the precipitated protein into a powdered form.

12. A method of isolating protein from soy flour according to claim 10 wherein step (c) comprises passing the slurry through an ultrafiltration device and collecting a permeate containing protein and a retentate containing phytate and aluminum and thereafter adding a diafiltration fluid to the retentate at substantially the same rate that the permeate is collected and passing said retentate through the ultrafiltration device.

13. A method of isolating protein from soy flour according to claim 11 wherein step (c) comprises passing the slurry through an ultrafiltration device and collecting a permeate containing protein and a retentate containing phytate and aluminum and thereafter adding a diafiltration fluid to the retentate at substantially the same rate that permeates are collected and passing said retentate through the ultrafiltration device.

14. A method of isolating protein from soy flour comprising the steps of:
   (a) providing an aqueous slurry comprising 7% to 15% by weight of defatted soy flour;
   (b) adjusting the pH of the slurry to be in the range of 7.5 to 9.5 at a temperature in the range of about 38° to about 54° C. such that protein in the slurry becomes solubilized;
   (c) passing the slurry through an ultrafiltration device and collecting a permeate containing protein and carbohydrates, and a retentate containing phytate and aluminum;
   (d) adjusting the pH of the permeate collected in step (c) to be in the range of 4.2 to 4.7 and allowing the protein to precipitate; and,
   (e) separating the precipitated protein from the remainder of the permeate, the phytate content of the precipitated protein of step (e) being less than 1.0%, by weight, as determined by the following procedure:
      (i) a protein isolate sample is weighed and extracted in 2.4% by vol. hydrochloric acid for two hours;
      (ii) the pH of the sample is then adjusted to be greater than 8, followed by quantitative transfer and dilution;
      (iii) the diluted sample is filtered through #2V filter paper and the filtrate is collected;
      (iv) an aliquot of the filtrate is injected into a mixed mode column and separation is achieved utilizing a 56 mM to 150 mM sodium hydroxide gradient, in the presence of 5% isopropyl alcohol at a flow rate of 1.0 ml per minute;
      (v) Using suppressed conductivity to detect phytate in the sample; and
      (vi) the phytate concentration of the sample is determined by comparing chromatographic data of the sample with standards of known concentrations of phytate.

15. A method of isolating proteins from soy flour according to claim 14 further comprising the step (f) of transforming the precipitated protein into a powdered form.

16. A method of isolating protein from a soy flour according to claim 14 wherein step (c) comprises passing the slurry through an ultrafiltration device and collecting a permeate containing protein and a retentate containing phytate and thereafter adding a diafiltration fluid to the retentate at substantially the same rate that the permeate is collected and passing said retentate through the ultrafiltration device.

17. A method of isolating protein from a flour according to claim 15 wherein step (c) comprises passing the slurry through an ultrafiltration device and collecting a permeate containing protein and a retentate containing phytate and thereafter adding a diafiltration fluid to the retentate at substantially the same rate that the permeate is collected and passing said retentate through the ultrafiltration device.

18. A method of isolating protein from flour according to claim 1 wherein in step (c) the ultrafiltration device comprises a membrane having an initial permeability to water of about 8.0.

19. A method of isolating protein from soy flour according to claim 10 wherein in step (c) the ultrafiltration device comprises a membrane having an initial permeability to water of about 8.0.

20. A method of isolating protein from soy flour according to claim 11 wherein in step (c) the ultrafiltration device comprises a membrane having an initial permeability to water of about 8.0.

21. A method of isolating protein from soy flour according to claim 14 wherein in step (c) the ultrafiltration device comprises a membrane having an initial permeability to water of about 8.0.

22. A method of isolating protein from soy flour according to claim 15 wherein in step (c) the ultrafiltration device comprises a membrane having an initial permeability to water of about 8.0.

* * * * *